United States Patent [19]

Miyazaki et al.

[11] Patent Number: 4,840,821
[45] Date of Patent: Jun. 20, 1989

[54] METHOD OF AND APPARATUS FOR FORMING FILM

[75] Inventors: Toshihiko Miyazaki; Kunihiro Sakai, both of Tokyo; Yoshinori Tomida, Yokohama; Hiroyuki Sugata, Kawasaki; Hiroshi Matsuda, Yokohama; Yukuo Nishimura, Sagamihara, all of Japan

[73] Assignee: Canon Kabushiki Kaisha, Tokyo, Japan

[21] Appl. No.: 157,146

[22] Filed: Feb. 11, 1988

Related U.S. Application Data

[63] Continuation of Ser. No. 864,536, May 19, 1986, abandoned.

[30] Foreign Application Priority Data

May 27, 1985 [JP] Japan .................................. 60-112066
May 27, 1985 [JP] Japan .................................. 60-112067
May 27, 1985 [JP] Japan .................................. 60-112069

[51] Int. Cl.⁴ .............................................. B25D 1/20
[52] U.S. Cl. .................................. 427/430.1; 118/402; 118/421; 427/434.3
[58] Field of Search ...................... 118/402, 403, 421; 427/434.3, 430.1

[56] References Cited

FOREIGN PATENT DOCUMENTS

486927  4/1976  U.S.S.R. .............................. 118/402

Primary Examiner—Shrive Beck
Attorney, Agent, or Firm—Fitzpatrick, Cella, Harper & Scinto

[57] ABSTRACT

A method and apparatus for forming an LB film on a substrate in which the film is deposited by raising and lowering the surface of the liquid on which the group of molecules is spread relative to the substrate.

2 Claims, 5 Drawing Sheets

METHOD OF AND APPARATUS FOR FORMING FILM

This application is a continuation of application Ser. No. 864,536 filed May 19, 1986 and now abandoned.

BACKGROUND OF THE INVENTION

1. Field of the Invention

The present invention relates to a method and apparatus for forming an organic thin film which is to be the main component of a device useful in the fields of semiconductors and optical technology, for example. More particularly, the present invention pertains to a method and apparatus for forming a monomolecular film or a built-up monomolecular film of an organic substance on a substrate.

2. Description of the Prior Art

Conventionally, development of materials employed in the semiconductor and optical technological fields has involved inorganic substances, owing to their relative ease in handling.

Recently, however, organic chemists have achieved remarkable technical developments in the semiconductor and optical fields. It have now been proposed to use an organic thin film in place of the conventionally-employed inorganic thin film in integrated circuit devices such as logic elements, memory elements or photoelectric conversion elements, and in optical devices such as microlens arrays or optical waveguides.

Such organic thin films can be manufactured by a conventional monomolecular build-up method. In this method (which is also called, "Langmuir-Blodgett's Technique", or "LB Technique"), molecules having hydrophilic and hydrophobic groups are evenly spread over the surface of water by taking advantage of the hydrophilic and hydrophobic nature of the molecules so as to form a monomolecular film. This film is then transferred onto the surface of a substrate, thus making it possible to form a monomolecular film or a built-up monomolecular film in which molecules are built up on top of each another. Hereafter, these films are each called, "LB film" as illustrated in U.S. Pat. No. 4,511,604.

Figure 4:
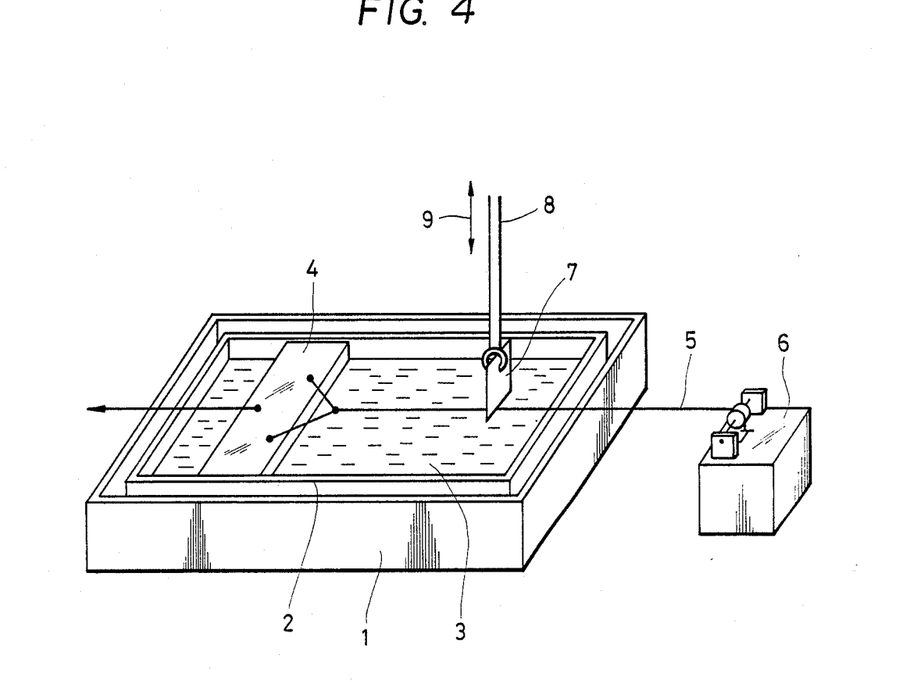
FIG. 4 is a perspective view of a conventional method and apparatus for forming a monomolecular film.

The conventional apparatus for forming LB films, as shown in FIG. 4, includes a square-shaped shallow, but wide, water tank 1 and a frame 2 which is disposed in the tank such that it horizontally encloses a water surface 3. The frame 2 functions as a two-dimensional cylinder, and its interior is provided with a square-shaped float 4 which has a width slightly smaller than the internal dimension of the frame 2. Float 4 serves as a two-dimensional piston and smoothly moves to the right and left, as illustrated in FIG. 4. In order to move the float 4 in both directions, float 4 is connected by a wire 5 to a winder 6 which is driven by a motor or the like.

To form a monomolecular film, a film-forming substance is dissolved in a volatile solvent, such as benzene or chloroform, and the solution is then dropped onto the surface 3 of the water. After the solvent has evaporated, a monomolecular film which exhibits two-dimensional behavior remains on the surface 3. When the areal density of the molecules is low, the film can be designated a gaseous film and is constituted of a two-dimensional gas. As the molecules spread over the water surface 3 are condensed and the areal density of the molecules is increased by moving the float 4 to the right, as viewed in FIG. 4, the interactions among the molecules are intensified. The gaseous film is then transformed into a two-dimensional liquid film and then, if the density of the molecules is further increased, into a two-dimensional solid film. In such a solid film, the molecules are oriented and show a high degree of order. Accordingly, the oriented and ordered molecules form a uniform and very thin film, which film properties are essential for a component of a semiconductor device.

Figure 5A:
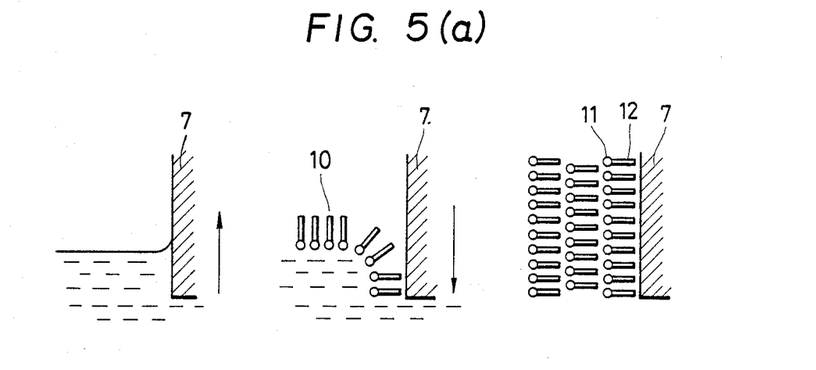
Figure 5B:
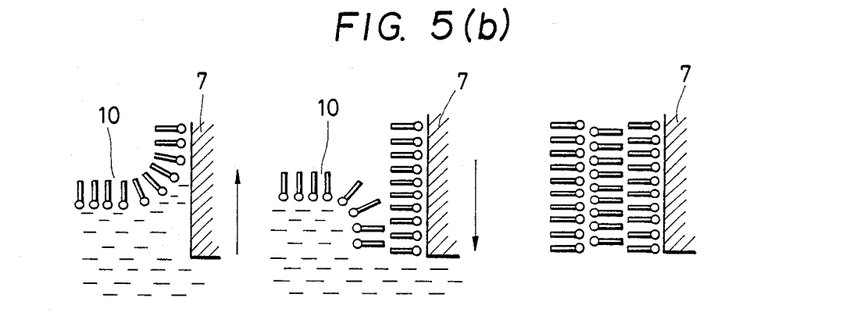
Figure 5C:
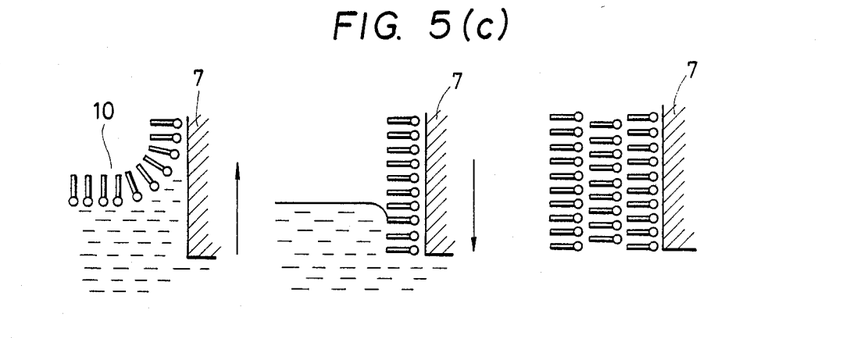

The thus-formed monomolecular film is transferred from the surface 3 of the water onto a substrate 7 in a vertical dip process. The vertical dip process is conducted by moving substrate 7 mounted on holder 8 in a vertical direction 9 perpendicular to the surface of the water, while retaining the monomolecular film on the surface 3 under a surface pressure of a predetermined value which is suitable for forming a built-up film. Three types of films can be built up by this process an X type, formed by depositing a monomolecular film 10 on the substrate 7, when the substrate 7 is merely dipped into the water, as shown in FIG. 5 (a); a Y type, formed by depositing the monomolecular film 10, when the substrate 7 is both dipped into and withdrawn from the water, as shown in FIG. 5 (b); and a Z type, formed by depositing the monomolecular film 10, when the substrate 7 is just drawn out of the water, as shown in FIG. 5 (c). In each molecule shown in FIG. 5, reference numeral 11 denotes its hydrophilic group, and 12, its hydrophobic group.

Another process for transferring the monomolecular film onto the surface of the substrate is represented by the horizontal deposition process (not shown). In this process, the substrate is moved vertically with respect to the surface 3 of the water with the substrate surface upon which the film is to be deposited being disposed substantially parallel to the surface of the water, as the monomolecular film is deposited.

The above-described conventional processes of transferring a monomolecular film have a disadvantage in that the device for moving the substrate in the vertical direction employs a motor with gears or the like. The vibrations produced by this motor are transmitted to the substrate so that the deposition of the monomolecular film is not even.

SUMMARY OF THE INVENTION

Accordingly, an object of the present invention is to provide a method and apparatus which enables a monomolecular film to be smoothly deposited on a substrate without being affected by any vibration of the substrate.

To these ends, the present invention provides an apparatus for forming an LB film on a substrate which comprises a reservoir for accommodating a liquid over whose surface a group of molecules is spread; means for retaining said substrate such that the substrate surface on which the film is formed faces the surface of the liquid in the reservoir; and means for raising and lowering the surface of the liquid contained in the reservoir relative to the substrate surface.

In another embodiment, the invention further provides as a means for raising and lowering the surface of the liquid contained in the reservoir relative to the substrate surface, an expandable vessel provided in the reservoir and a fluid supply and discharge means which expands and contracts the vessel by supplying fluid thereto and discharging it therefrom.

In a further embodiment, the invention additionally provides a liquid supply and discharge means for supplying and discharging the liquid into the reservoir.

In an additional embodiment, the invention also provides as a means to raise and lower the surface of the liquid contained in the reservoir relative to the substrate surface, a means for raising and lowering the reservoir.

The present invention also provides a method of forming an LB film on a substrate which comprises positioning a surface of the substrate such that it faces the surface of a liquid on which a group of molecules is spread and moving the surface of the liquid relative to the surface of the substrate to contact the surface of the substrate and to form the LB film thereon.

BRIEF DESCRIPTION OF THE DRAWINGS

FIGS. 1 (a) and 1 (b) to FIGS. 3 (a) and 3 (b) are longitudinal sectional views of embodiments of the present invention;

FIG. 5 (a), 5 (b) and 5 (c) show how the molecules in a monomolecular film or a built-up monomolecular film are oriented.

DESCRIPTION OF THE PREFERRED EMBODIMENTS

An apparatus for forming a film according to the present invention has means for raising and lowering a water surface on which a group of molecules is spread relative to a substrate. The surface of the water can be raised and lowered by either moving the surface of the water within the liquid tank in the vertical direction, or by moving the liquid tank containing the liquid in the same direction.

Preferred embodiments of these two embodiments will be described hereinunder with reference to the accompanying drawings, in which the same reference numerals are used to denote the same parts as those of the conventional apparatus taken in conjunction with FIG. 4.

Figure 1A:
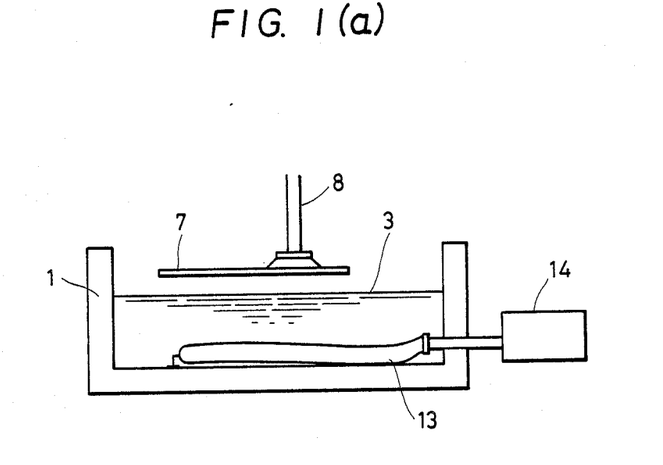
Figure 1B:
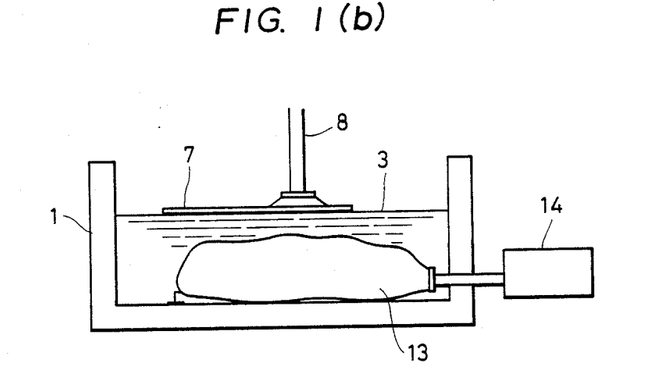

FIGS. 1 (a) and 1 (b) are longitudinal sectional views of an embodiment of the present invention, showing an apparatus for forming a film which is employed in a horizontal deposition process as compared to the conventional vertical deposition process in FIG. 4. The substrate surface is retained horizontally relative to the water surface. The apparatus as schematically shown includes a shallow and wide water tank 1 containing a desired amount of water and a substrate 7 retained by a substrate holder 8 which is oriented over and substantially parallel to the water surface 3 such that the substrate surface onto which a monomolecular film is transferred, faces downward. A vessel 13 is provided in the reservoir and is adapted to expand and contract. A fluid supply and discharge section 14 is connected to the vessel 13 for adjusting the amount of fluid to be contained in the vessel 13.

In the apparatus shown in FIG. 1 (a), vessel 13 has not yet been supplied with fluid. Therefore, water surface 3 is low, and substrate 7 is not in contact with water surface 3. In this state, a substance for forming a monomolecular film is applied to the water surface 3 to form a monomolecular film at a surface pressure controlled to the desired value by a surface pressure control means (not shown). When air is sent into the vessel 13 from the fluid supply and discharge section 14, surface 3 of the water rises proportionally to the volume of the supplied air, and monomolecular film makes contact with the lower surface of the substrate 7, and is then transferred onto the substrate 7, as shown in FIG. 1 (b).

The surface 3 of the water is raised very smoothly without creating any significant vibrations, thereby promoting the transfer of a minute film. Further, it is not necessary to include a mechanism for vertically moving the substrate. This feature makes the construction of the apparatus simpler and facilitates the holding of the substrate, thereby permitting this apparatus to be suitably employed in a horizontal deposition process in which a film can be deposited on a substrate which is large in size.

The foregoing embodiment illustrates forming the X type film, which is deposited when the water surface 3 is raised. A Z type film may also be formed by initially immersing the substrate 7 in the water and then lowering the water surface by discharging air or other suitable fluid from fluid supply and discharge section 14.

A liquid or a gas other than the air may alternatively be employed in place of air with the same effect.

Any vessel can be employed as the vessel 13 of the present invention, so long as it can expand and contract in accordance with the change in its internal pressure. Such a vessel typically includes a rubber bag and a bellows vessel.

Figure 2A:
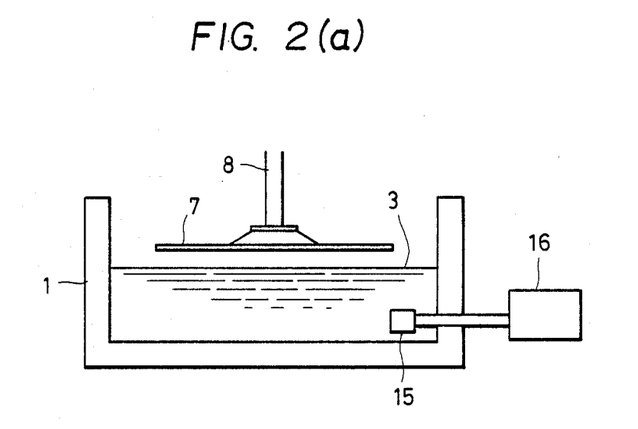
Figure 2B:
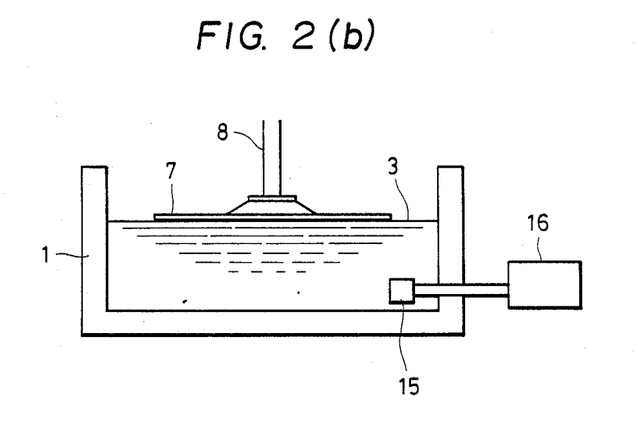

FIGS. 2 (a) and 2 (b) are longitudinal sectional views of another embodiment of the present invention, showing the apparatus for forming a film which is employed in a horizontal deposition process, and which includes means for supplying and discharging liquid. The apparatus shown in FIGS. 2 (a) and 2 (b) includes a shallow and wide water tank 1 containing a desired amount of water, and a substrate 7 retained by a substrate holder 8 which is oriented substantially parallel to the water surface 3 such that a surface thereof onto which the monomolecular film is transferred, faces downward. A liquid outlet 15 is provided in the water, and a liquid rate control section 16 is connected to the liquid outlet 15. The liquid to be discharged into the water tank 1 from the liquid outlet 15 should have a specific gravity value which is sufficient to prevent it from floating to the surface 3 of the water. The liquid should also have a relatively high viscosity so that it does not create any waves. The liquid outlet 15 is disposed near the bottom of the water. Water may be employed as the liquid to be discharged. In such event, it is not necessary to take these requirements into consideration.

In the apparatus shown in FIG. 2 (a), the liquid has not yet been discharged into the water, and therefore water surface 3 is low and substrate 7 is not in contact with surface 3. In this state, a substance constituting a monomolecular film is applied to the water surface 3 to form the monomolecular film at a surface pressure controlled to a desired value by the surface pressure control means (not shown). When the liquid to be discharged is sent into the water slowly from the liquid outlet 15, the water surface 3 rises proportionally to the volume of the supplied liquid. As a result, the monomolecular film makes contact with the lower surface of the substrate 7, and is transferred onto the substrate 7, as shown in FIG. 2 (b).

In this embodiment, it is possible to transfer a minute film and to make the apparatus simple, as in the first embodiment. The Z type film may also be formed by immersing substrate 7 in the water initially and then lowering water surface 3. The X type film is formed when water surface 3 is raised to contact the substrate surface.

Figure 3A:
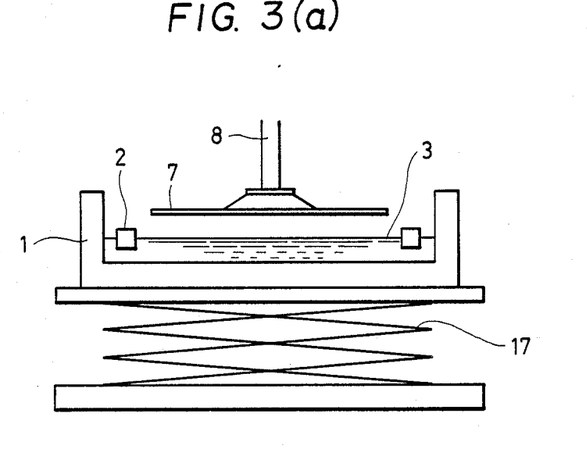
Figure 3B:
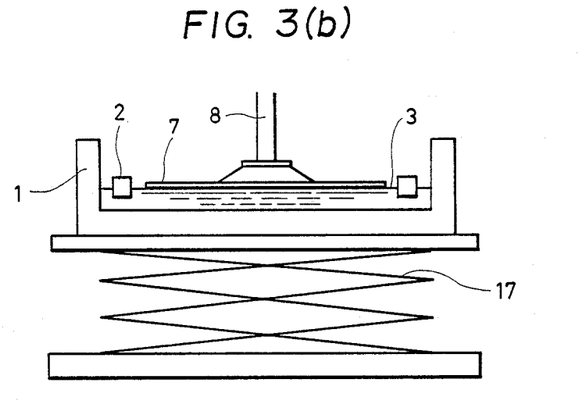

FIGS. 3 (a) and 3 (b) are longitudinal sectional views of still another embodiment of the present invention, showing the apparatus for forming a film which is employed in a horizontal deposition process. The apparatus shown in FIGS. 3 (a) and 3 (b) includes a shallow and wide water tank 1, frame 2 disposed inside the water tank so as to horizontally enclose water surface 3, substrate 7 retained by holder 8 substantially parallel to water surface 3 such that a surface thereof onto which the monomolecular film is transferred faces downward, and a mechanism 17 for raising and lowering the water tank 1.

In the apparatus shown in FIG. 3 (a), water tank 1 is located at a lower position beneath the substrate, and therefore substrate 7 is not in contact with surface 3 of the water. In this state, a substance constituting a monomolecular film is applied to surface 3 of the water to form the monomolecular film at a surface pressure set to a desired value by the surface pressure control means (not shown). When water tank 1 is raised by the tank elevating mechanism 17 to a second position, water surface 3 is also raised, and the monomolecular film makes contact with the lower surface of substrate 7, and is transferred thereonto, as shown in FIG. 3 (b).

In this case, if water surface 3 is raised slowly and smoothly, it is not necessary to take into consideration vibrations of the substrate such as those which occur in the conventional vertical deposition apparatus. This enhances the quality of the transferred film. The device for raising and lowering the tank has a very simple structure, unlike the mechanism conventionally employed for raising and lowering the substrate. With this simplified device, it is easy to retain the substrate. Therefore, the apparatus of this embodiment can be suitably employed in a horizontal deposition process in which a film can be deposited on a substrate which is large in size.

The above embodiment was explained by way of an example for forming an X type film, which is deposited when water surface 3 is raised. However, a Z type film may also be formed by immersing substrate 7 in the water initially and then lowering water surface 3.

The foregoing embodiments illustrate forming the LB film by transferring the film onto the substrate surface which is retained parallel to the water surface. A Y type film may also be formed by retaining a substrate surface onto which the film is formed perpendicular to the water surface and then moving the water surface relative to the substrate surface.

As will be understood from the foregoing description, a group of molecules is transferred, according to the present invention, by raising and lowering the surface of the water rather than the substrate. Therefore, the substrate can be allowed to remain at a predetermined position during the deposition process. The transferred film is not adversely affected by mechanical vibrations which arise when the substrate is raised and lowered. This feature ensures that the resulting LB film does not have pinholes or the like.

It is expected that the surface of the water will be slightly agitated as it is raised and lowered. Even so, the vibration caused by this agitation is not transmitted to the substrate which has been fixedly secured. Consequently, it is possible to prevent the orientation of the resulting monomolecular film or a built-up monomolecular film from being disturbed by a vibrating substrate and by agitation of the surface of the water, which would occur if the mechanically vibrated substrate were dipped under the water.

Further, since no mechanism for raising and lowering the substrate is included, the apparatus of this invention is simpler and the retaining of the substrate is facilitated, thereby allowing a film to be deposited on a substrate of large size. As a result, the method and apparatus for forming a film of the present invention is suitably adopted in a horizontal deposition process.

This invention is not to be limited except as set forth in the following claims.

What is claimed is:

1. A method of forming a Langmuir-Blodgett film on a substrate which comprises:
    positioning a surface of said substrate such that it faces the surface of a first liquid on which a group of molecules is spread, said liquid contained in a reservoir; and
    supplying and discharging a second liquid to said reservoir which can be distinctly separated from said first liquid so as to increase and decrease the total volume of liquid in the reservoir thereby moving up and down the surface of said first liquid over which said group of molecules is spread, wherein said liquids are in contact and immiscible with one another with each having a different viscosity and specific gravity from the other such that said liquids do not mix and such that said second liquid which is supplied to and discharged from said reservoir remains in the lower portion of said reservoir.

2. An apparatus for forming a Languir-Blodgett film on a substrate which comprises:
    a reservoir containing a first liquid over whose surface a group of molecules is spread; said reservoir having a liquid outlet provided in a lower portion thereof;
    means for retaining said substrate such that the substrate surface on which the film is to be formed faces the surface of the first liquid in the reservoir; and
    a liquid supply and discharge means for supplying and discharging a second liquid into and from said reservoir through said liquid outlet in such a manner that said first and second liquids are distinctly separated from each other in the reservoir;
    said first and second liquids being in contact with each other and immiscible with one another, each liquid having a different viscosity and specific gravity from the other such that said liquids do not mix and such that said second liquid which is supplied to and discharged from the reservoir remains in the lower portion of the reservoir.

* * * * *

UNITED STATES PATENT AND TRADEMARK OFFICE
CERTIFICATE OF CORRECTION

PATENT NO. : 4,840,821
DATED : June 20, 1989
INVENTOR(S) : TOSHIHIKO MIYAZAKI, ET AL.

Page 1 of 2

It is certified that error appears in the above-identified patent and that said Letters Patent is hereby corrected as shown below:

On the title page:

IN [56] REFERENCES CITED

Insert:    --U.S. PATENT DOCUMENTS

| | | | |
|---|---|---|---|
| 289,688 | 12/1883 | Morrison | 118/421 |
| 618,672 | 1/1899 | Henry | 118/421 |
| 768,756 | 8/1904 | Kitsee | 118/421 |
| 2,771,049 | 11/1956 | Fish | 118/421 |
| 3,130,068 | 4/1964 | Whitley | 118/421X |
| 3,589,330 | 6/1971 | Alexeff | 118/421 |
| 4,102,304 | 7/1978 | Debenham | 118/421 |
| 4,204,498 | 5/1980 | Ivancic | 118/421 |
| 4,511,604 | 4/1985 | Barraud et al. | 118/402 |

After FOREIGN PATENT DOCUMENTS, insert:

--69,742  8/1949  Denmark .............. 118/402--.

COLUMN 1

Line 25, "have" should read --has--
Line 43, "called," should read --called--.

COLUMN 2

Line 18, "process" should read --process:--.

UNITED STATES PATENT AND TRADEMARK OFFICE
CERTIFICATE OF CORRECTION

PATENT NO. : 4,840,821
DATED : June 20, 1989
INVENTOR(S) : TOSHIHIKO MIYAZAKI, ET AL.

Page 2 of 2

It is certified that error appears in the above-identified patent and that said Letters Patent is hereby corrected as shown below:

COLUMN 4

Line 19, "water surface" should read
    --water surface 3--.

COLUMN 6

Line 40, "Languir-Blodgett" should read
    --Langmuir-Blodgett--.

Signed and Sealed this

Twenty-third Day of October, 1990

Attest:

HARRY F. MANBECK, JR.

*Attesting Officer*      *Commissioner of Patents and Trademarks*